C. H. SMOOT.
BRUSH HOLDER FOR DYNAMOS.
APPLICATION FILED DEC. 14, 1906. RENEWED MAY 6, 1913.
1,078,174.
Patented Nov. 11, 1913.
2 SHEETS—SHEET 1.
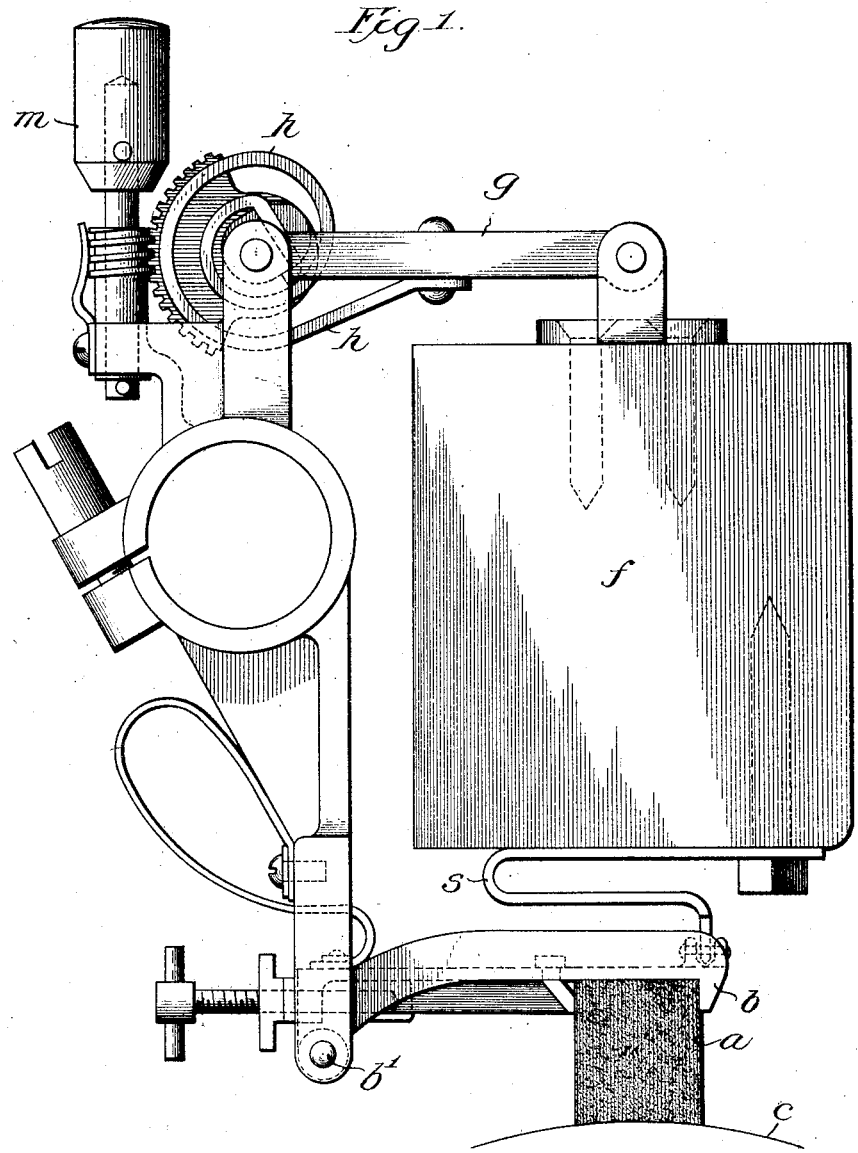
Witnesses:
Irving Macdonald.
Alfred H Moore
Inventor:
Charles H. Smoot,
By Barton, Panner & Folk,
Attys.

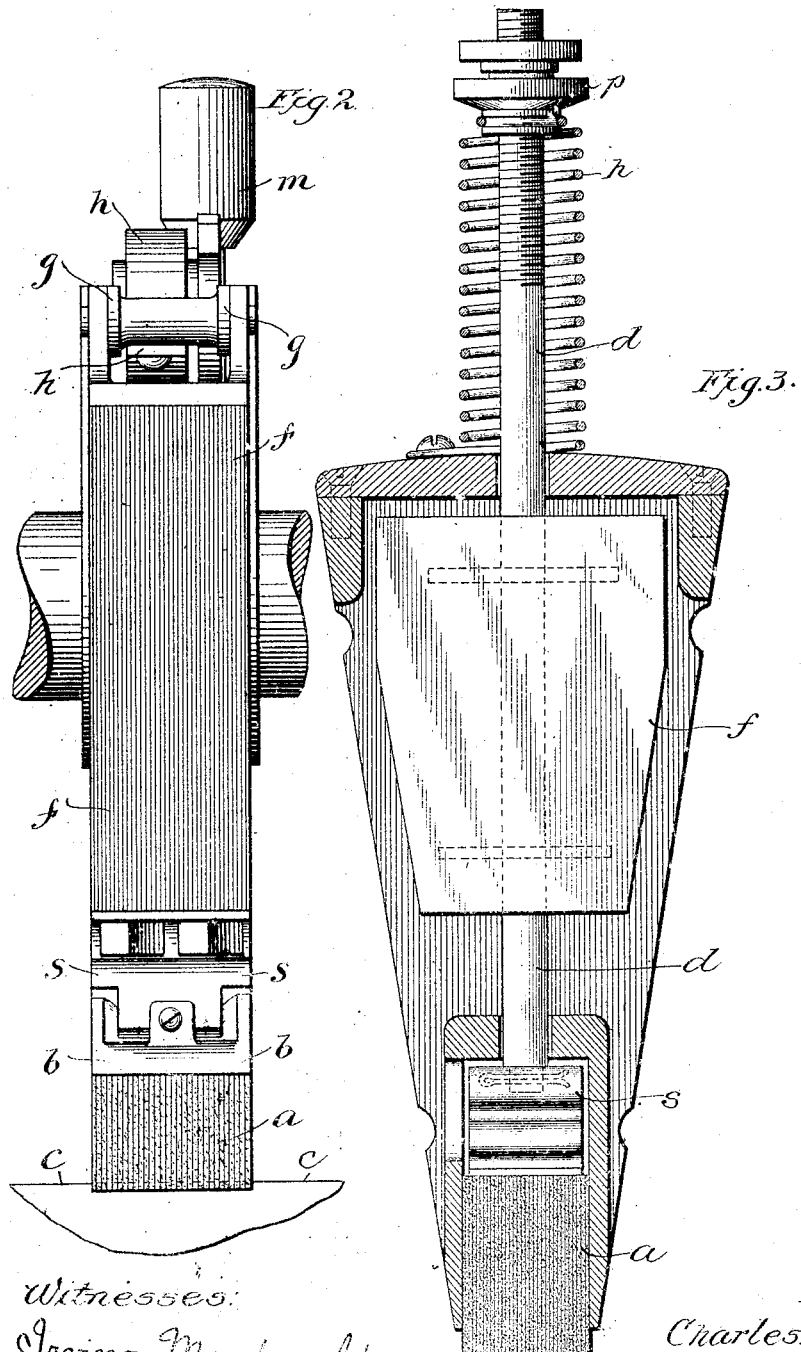

UNITED STATES PATENT OFFICE.

CHARLES H. SMOOT, OF CHICAGO, ILLINOIS, ASSIGNOR, BY MESNE ASSIGNMENTS, TO RATEAU BATTU SMOOT COMPANY, A CORPORATION OF NEW YORK.

BRUSH-HOLDER FOR DYNAMOS.

1,078,174.  Specification of Letters Patent.  Patented Nov. 11, 1913.

Application filed December 14, 1906, Serial No. 347,826. Renewed May 6, 1913. Serial No. 765,907.

*To all whom it may concern:*

Be it known that I, CHARLES H. SMOOT, a citizen of the United States, residing at Chicago, in the county of Cook and State of Illinois, have invented a certain new and useful Improvement in Brush-Holders for Dynamos, of which the following is a full, clear, concise, and exact description.

My invention relates to a brush holder for dynamo electric machines, such as generators and motors, whether of the alternating or direct current type, and is more particularly intended for use on high speed machines, such as those which are direct-driven by steam turbines, and run at several thousand revolutions per minute. These high speed machines are very dependent for their successful operation upon the perfection of the surface of the commutator or collector, and of the contact between such surface and the brushes. In such machines it is an extremely difficult matter to keep the brushes continuously in contact with the commutator or collector surface, because inequalities in the surface tend to make the brushes jump off the commutator and stay out of contact a sufficient time to cause sparking.

As in ordinary types of machines, it is desirable to use carbon brushes, because they aid in securing sparkless operation, and the effects of sparking are less destructive in case any should occur. Difficulties have heretofore been experienced in using carbon brushes on high speed commutators on account of the impossibility of keeping the commutator or collecting surface absolutely true; and if it is not true the carbon brushes, when used in any of the ordinary forms of brush holder heretofore proposed, will be knocked out of contact with the commutator by exceedingly slight surface irregularities, and thus give rise to sparking as above described. If an attempt is made to make the brushes stay in contact with the revolving surface of the commutator or collector by applying a very heavy pressure to them, the friction caused by the rubbing of the brushes at the very high peripheral speeds employed will cause both the commutator and brushes to become too hot. This will be apparent when it is understood that a peripheral speed of eight thousand feet per minute for the commutator is desirable for turbo-generators.

The present invention provides a means whereby the brushes may be maintained continuously in good contact with the commutator or collector at the high speeds above mentioned, and caused to follow with the necessary rapidity any slight variations or irregularities in the rotating collector surface.

The invention contemplates the use of a contact brush of small inertia bearing on the collector, and a very stiff spring of great strength acting upon the brush from a movable support of relatively great inertia, such as a weight. The weight, acting through the stiff spring upon the brush, serves to maintain constant average pressure thereon, while the stiff spring, having a natural period of vibration considerably higher than the frequency of rotation of the collector, and adapted to increase its tension very greatly upon a very slight compression, causes the brush to follow very rapidly the irregularities in the rotating collector surface.

The invention also consists in certain details of construction of a brush holder having the general characteristics above described. Such a holder is shown in the accompanying drawings, in which—

Figure 1 is a side elevation of the mechanism taken transversely to the axis of the commutator; Fig. 2 is a view of the brush holder mechanism taken at right angles to Fig. 1; and Fig. 3 is a sectional elevation of a modified form of brush holder mechanism.

The same letters of reference indicate the same parts wherever they are shown.

Referring first to Fig. 1, the surface of the rotating commutator (or collector ring) is indicated by the arc $c$. The carbon brush $a$ is held in a movable holder or clamp $b$ pivoted at $b^1$ to the frame of the brush holder mechanism, which is intended to be attached in the usual manner to the rocker arm (not shown) of the machine. The carbon brush and its pivoted holder are of slight inertia, so that the brush may be vibrated very rapidly to follow the irregularities of the rotating commutator or collector surface. Such responsiveness of the brush and holder is secured by means of the stiff spring $s$ which is arranged to act upon the brush, or what amounts to the same thing, upon the movable holding clamp $b$, from a base or support $f$ of relatively great inertia. As shown in the drawing, the support $f$ is a lead block or weight of say seven pounds, which is yieldingly supported at the top, and partially sustained at the bottom by the stiff spring $s$ through which said weight acts upon the carbon brush to maintain a constant average tension thereon. The spring $s$ is shown as a short piece of flat spring steel or bronze bent into a U or zigzag form. The spring and carbon should have a very high natural period of vibration, greater than the frequency of rotation of the collector, and should be adapted to greatly increase its tension when compressed by a very slight eccentricity of the commutator. In the brush holder shown, the stiffness of the spring may be such that the natural period of vibration of the moving system, comprising the carbon, the holding clamp and the spring, would be about ninety five hundred complete vibrations per minute. A spring having a stiffness of seven hundred pounds per inch of deflection would give good results. In general, the spring should increase its tension approximately twenty per cent. or more, upon a compression due to irregularities of the collector surface as small as two-thousandths of an inch, and should have a total natural range of motion equal to only a few times the ordinary eccentricity of the collector. By having the contact brush of small inertia acted upon by a stiff compression spring as above described, backed by a mass of considerable inertia, the brush is caused to respond to variations in the collector surface so as to maintain a good contact continuously in spite of slight variations or eccentricities of the surface; this being secured without maintaining an excessive average pressure of the brush against the commutator.

The weight $f$ is partially sustained at the top by the pivoted arm $g$, acted upon by a spiral spring $h$, which may be adjusted to allow any desired proportion of the total weight to bear upon the carbon brush through the stiff spring. As shown in the drawing, a manually-adjustable worm gear is provided for adjusting the tension of the spiral spring $h$ acting upon the arm $g$ which supports the upper end of the weight $f$.

As the brush $a$ and the collector surface wear away, it will be seen that the holding clamp $b$ will gradually take an advanced position; but the average tension upon the spring $s$ is maintained in this advanced position by the spring-mounted weight $f$ of great inertia, which follows up said spring to form a relatively fixed backing or support therefor. The average pressure of the brush upon the commutator may be adjusted to a suitable value for the conditions imposed, by regulating the tension of the sustaining spring $h$ by means of the manual adjusting screw $m$. In the brush holder shown, for example, the spring $h$ may be adjusted to exert a lifting force upon the weight $f$ of sufficient strength so that the average effective pressure exerted by the weight $f$ upon the carbon brush will be in the neighborhood of two pounds per square inch of brush surface. For brush holders which are located on the under side of the commutator, so that the brush is required to press upwardly instead of downwardly, the spring $h$ will of course have to be adjusted to overcome the effect of gravity in the inertia mass and in addition supply the necessary brush pressure.

The natural period of vibration of the whole moving system, comprising the weight $f$, the two springs and the brush and holding clamp, should be such that it will not be in synchronism with the rate of revolution of the collector, otherwise there would be a resonance effect, and any slight inequalities would set up vibrations which might produce serious difficulty in operation. In the example shown, if the commutator were revolving at three thousand revolutions per minute, the construction of the moving system may be such that the natural period of vibration of the inertia mass would be about two thousand per minute.

In Fig. 3 I have illustrated a modified form of my invention in which the brush $a$ is slidably mounted in a cartridge form of brush holder. The inertia weight $f$ is carried by a rod $d$ which bears at its lower end upon the stiff spring $s$ interposed between said rod and the top of the carbon brush. The upper end of the rod carrying the inertia weight is sustained by a compression spring $h$ which corresponds in function with the spiral spring $h$ in Fig. 2. An adjusting nut and set nut are arranged to screw upon the upper end of said rod $d$ to adjust the tension of the spring $h$. Said spring $h$ has a considerable natural period of motion without a great change in tension; whereas the stiff spring $s$ has only a very slight natural range of motion, and is adapted to greatly increase its tension upon a very slight compression. The stiff compression spring $s$ acting between the inertia weight and the carbon brush $a$ thus causes said brush to follow very rapidly any slight variations in the rotating collector surface; and as the collector surface and the brush gradually wear away the spring $h$ permits the inertia mass to follow up the advance of the stiff spring and maintain an approximately constant average tension upon the brush as it wears away.

I claim:

1. The combination with a high speed rotary collector, of a contact brush of slight inertia bearing thereon, a mass of relatively great inertia, and a stiff spring having a great changes of force under slight movement, acting between said inertia mass and said brush, said weight exerting pressure upon said brush through said spring.

2. The combination with a high speed rotary collector, of a brush of slight inertia bearing thereon, a yieldingly-supported inertia weight and a compression spring of great stiffness and strength acting between said inertia weight and said brush, said weight exerting pressure upon said brush through said spring.

3. The combination with a rotary collector, of a contact brush of slight inertia bearing thereon, an inertia weight, a compression spring of great stiffness and strength interposed between said inertia weight and said brush, a rigid support and a spring connecting said inertia weight with said rigid support.

4. The combination with a high speed rotary collector, of a rigid brush holder support, a contact brush bearing upon said collector, and a moving system comprising an inertia weight, a stiff compression spring acting between the inertia weight and the brush, and a spring acting between the inertia weight and the support.

5. The combination with a high speed rotary collector, of a rigid brush holder support, a contact brush bearing upon said collector, and a moving system comprising an inertia weight, a stiff compression spring acting between the inertia weight and the brush, and a spring acting between the inertia weight and the support, said moving system being proportioned and adjusted to have a natural period of vibration not in harmony with the frequency of revolution of the collector.

6. The combination with a high speed collector, of a contact brush bearing thereon, an inertia mass, a spring between the brush and said mass, the frequency of vibration of the brush and its spring being higher than the frequency of rotation of the collector, and the frequency of vibration of the total moving system being out of harmony with the frequency of rotation.

7. The combination with a high speed rotary collector, of a contact brush bearing thereon, an inertia weight supported upon a longitudinally movable rod, bearings in which said rod is adapted to slide, a compression spring of great strength and stiffness interposed between one end of said rod and said carbon brush, and a spring encircling said rod and mounted to assist in sustaining said weight.

In witness whereof, I hereunto subscribe my name this 8th day of December A. D., 1906.

CHARLES H. SMOOT.

Witnesses:
 De Witt C. Tanner,
 Alfred H. Moore.